United States Patent [19]
Lowe et al.

[11] Patent Number: 4,579,361
[45] Date of Patent: Apr. 1, 1986

[54] IMPLEMENT CART

[75] Inventors: Terry L. Lowe; Donald T. Sorlie, both of Ankeny; David H. Bucher, Des Moines, all of Iowa

[73] Assignee: Deere & Company, Moline, Ill.

[21] Appl. No.: 608,601

[22] Filed: May 9, 1984

[51] Int. Cl.⁴ .............................................. B62D 53/04
[52] U.S. Cl. ................................. 280/411 R; 16/35 R; 172/386; 172/677; 280/5 E; 280/474; 280/476 A; 280/490 R
[58] Field of Search ............... 280/411 R, 411 C, 412, 280/415 A, 408, 410, 476 R, 476 A, 490 R, 86, 474, 5 R, 5 H, 5 C, 5 D, 5 E; 172/383, 386, 673, 677; 16/35 R; 222/621

[56] References Cited

U.S. PATENT DOCUMENTS

| | | | |
|---|---|---|---|
| 2,603,497 | 7/1952 | Bramann et al. | 280/5 E |
| 3,062,563 | 11/1962 | Pearce | 280/474 X |
| 3,142,086 | 7/1964 | Thomas | 16/35 R |
| 3,428,335 | 2/1969 | Clark | 280/5 E X |
| 3,655,221 | 4/1972 | Warner | 280/490 R |
| 3,719,373 | 3/1973 | Johnson | 280/474 |
| 4,426,096 | 1/1984 | Rodrigues, Jr. et al. | 280/411 C |

FOREIGN PATENT DOCUMENTS 103253  12/1941  Sweden ................. 280/474

Primary Examiner—John A. Pekar
Assistant Examiner—Mitchell J. Hill

[57] ABSTRACT

A spray cart which straddles a trailing implement hitch and supports a tank on two castering wheels and on the tractor hitch. The caster wheels have adjustable tread, and the caster wheel support structure provides additional strength to the tank support frame. A stabilizer bar is connected between the cart and the trailing implement to make them operate as a single unit. The cart serves to closely connect the trailing implement and the tractor and provide straight-line pull through the system.

20 Claims, 5 Drawing Figures

IMPLEMENT CART

BACKGROUND OF THE INVENTION

The present invention relates generally to carts, and more specifically to a spray cart adapted for connection between the hitch of a towing vehicle such as a tractor and the hitch of a trailing implement such as a field cultivator or finishing tool.

Chemicals such as herbicides are commonly incorporated in the ground during soil-working operations. When liquids are incorporated, a sprayer and one or more tanks are usually mounted on the tractor or the tillage tool. However, such mounting requires much time and labor and usually the sprayer is not easily detachable to free the tractor or tillage tool for other work. In tool-mounted sprayers, uneven incorporation often results because the tank loses weight as the solution is applied and the weight on the tillage tool decreases.

In an attempt to overcome some of the problems involved with tractor- or implement-mounted sprayers, various cart arrangements have been devised. A typical spray cart includes a transverse frame mounted on at least two transversely spaced caster wheels and has a forwardly extending tongue member which rests on the hitch of the trailing implement. The trailing implement is connected in the usual fashion to the tractor hitch. A tongue mounting bracket is connected to the trailing implement hitch, and the spray cart tongue is pinned to the bracket. With such an arrangement, it is usually difficult to gain access to the tank. To tow the cart away from the implement, it is usually necessary to disconnect the implement from the tractor and then connect up a special hitch structure to the spray cart tongue. Such a procedure is generally time-consuming and inconvenient. Rub plates are generally utilized to center the cart on the implement hitch and prevent interference between the cart and the implement hitch.

In another type of cart, such as exemplified by U.S. Pat. No. 4,426,096, the cart hitch is attached to the tractor hitch, and the implement, in turn, is attached to the spray cart directly rearwardly of the connection to the tractor. This type of structure eliminates need for supporting the spray cart on the implement hitch. However, the cart shown therein is supplied with fixed axle wheels which must be relatively widely spaced to prevent interference during short turns, and the spacing between the wheels cannot be easily adjusted, for example, to permit the wheels to ride between ridges when a ridge type of cultivation is employed. Although other types of spray carts utilize adjustable wheel assemblies, the adjusting structure is usually quite cumbersome and expensive, and the range of transverse adjustment of the wheels is usually limited in an inwardly direction by the end of the tank and by the outer beam of the generally boxed-shaped frame structure in the outward direction.

When the tank cart with caster wheels is being towed without a trailing implement, it is desirable to lock the wheels against castering to prevent instability. Heretofore, various transport lock or breaking arrangements for the caster wheels have been devised, but these generally have been fairly complicated or difficult to operate to lock and unlock the wheels.

It is desirable to provide a cart which is simple in construction and yet rugged in both function and appearance. At the same time, it is desirable to keep the tank as low as possible on the frame without interferring with the implement hitch or with the transverse adjustability of the wheels.

It is therefore an object of the present invention to provide an improved implement cart adapted for connecting between a towing vehicle and a trailing implement.

It is a further object of the present invention to provide a cart which is not supported on the hitch structure of the trailing implement and which is easy to connect and disconnect both with respect to the tractor and to the trailing implement.

It is yet another object of the present invention to provide a spray cart wherein the operator has convenient access to the spray tank. It is yet another object of the invention to provide a spray cart adapted for towing behind a tractor and forwardly of a trailing implement wherein special mounting brackets and/or rub plates are eliminated. It is a further object to provide such a cart which has improved tracking.

It is another object of the present invention to provide a cart wherein the spacing between the wheels is easily adjustable. It is still another object to provide such a cart wherein the wheels are transversely adjustable over a substantial width of the machine without interference from either the tank assembly or the outermost ends of the tank-support frame.

It is yet another object of the invention to provide a spray cart with a pair of caster wheels wherein a simple and reliable adjustment is provided to prevent castering of the wheels.

It is still another object of the present invention to provide a spray cart having a simple tubular frame construction with advantageous hitch and tank-support structure, and wherein the tank is easily accessible by the operator. It is also an object to provide such a cart with a tank support structure which reduces stresses in the tank.

SUMMARY OF THE INVENTION

A spray cart constructed in accordance with the teachings of the present invention includes a generally H-shaped main tank-support frame having a pair of transversely extending beams and supported in generally a horizontal attitude. The outermost ends of the beams are devoid of permanently connected fore-and-aft connecting structure but instead support transversely adjustable caster wheel supporting beams which lend additional rigidity and strength to the tank-support frame. Hitch structure extends downwardly and forwardly from the H-shaped frame to a forwardly extending link adapted for connection to the tractor. A beam extends rearwardly from the forward link to a rearwardly directed link which is adapted for straight-line connection to the towing vehicle with none of the weight of the cart supported on the towed implement. A liquid tank is supported on saddle structure above the H-shaped frame and an operator platform is connected to the hitch structure for convenient access to the tank. The platform provides additional structural reinforcement near the connection of the hitch structure to the H-shaped frame. The arrangement of the hitch structure provides convenient hitching and unhitching from the towing vehicle and permits easy connection of a variety of trailing implements with a minimum of hookup time. A rear stabilizer bar is connected between the rear of the cart frame and the implement or implement hitch to substantially fix the relationship of the cart to the implement and thereby prevent the implement hitch from interferring with the cart during sharp turns. The stabilizer bar also eliminates need for rub plates and the like and causes the cart to track directly behind the towing vehicle, even on slopes.

A simple sliding bracket connected to each of the caster wheel support beams and positionable against the yoke of the respective caster wheel permits the wheels to be locked in a straight-ahead position when the cart is being towed without a trailing implement. The caster wheel support beams are connected by brackets to the underside of the H-shaped frame to permit substantial transverse adjustment of the caster wheels relative to each other without interferring with the tank or tank-support structure. A simple, tubular frame structure is provided which is sturdy and eliminates complicated caster wheel mounting structure.

These and other objects, features and advantages of the present invention will become apparent to those skilled in the art from the description which follows and from the drawings.

DESCRIPTION OF THE PREFERRED EMBODIMENT

Figure 1:
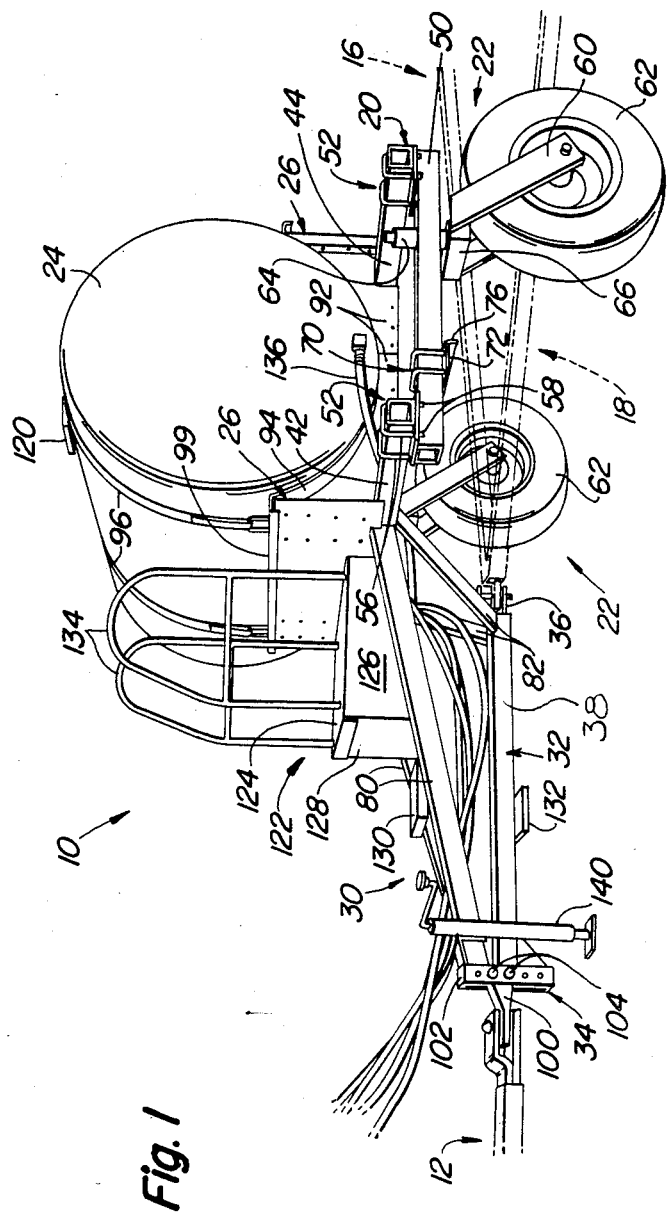
FIG. 1 is a perspective view of the cart constructed in accordance with the teachings of the present invention.

Referring now to FIG. 1, therein is shown a spray cart 10 connected to the hitch 12 of a tractor 14. A trailing implement 16, which may be a field cultivator or finishing tool or the like, includes a forwardly directed implement hitch 18 which is connected to the spray cart 10 for towing rearwardly thereof through a field.

The spray cart 10 includes a transversely extending, tank-supporting frame 20 supported for movement forwardly (FIG. 2) over the ground by a pair of caster wheel structures 22 connected for transverse adjustment with respect to the ends of the frame 20. A cylindrically shaped polyethylene tank 24 rests on tank-support structure 26 which in turn is connected to the frame 20.

Hitch structure 30 is connected to and extends forwardly and downwardly from the tank-supporting frame 20 to a connection with a generally horizontal and fore-and-aft extending, double-ended link hitch 32. The link hitch 32 includes a vertically adjustable, forwardly extending link 34 adapted for connection to the tractor hitch 12 and a rearwardly extending link 36 adapted for connection to the implement hitch 18 at a location (FIG. 4) forward of the frame 20. The links 34 and 36 are connected to the opposite ends of a horizontal fore-and-aft extending hitch beam 38.

Figure 2:
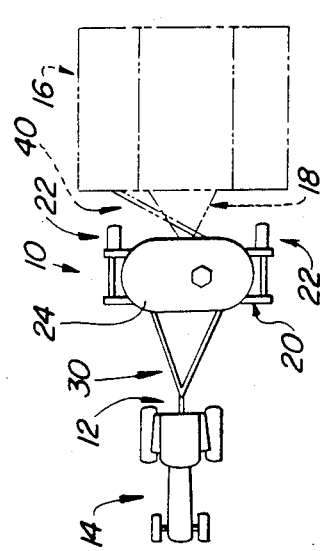
FIG. 2 is a schematic representation of the cart of FIG. 1 connected between a tractor and a trailing implement.
Figure 3:
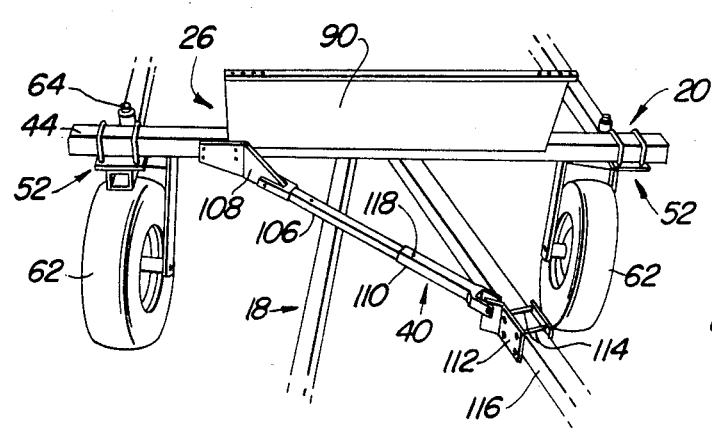
FIG. 3 is a perspective view of a portion of the rear of the cart of FIG. 1 and showing the stabilizer bar connected between the cart frame and the trailing implement hitch.

Stabilizing structure, indicated generally at 40 (FIG. 3), is connected between the frame 20 and the trailing implement hitch 18 or the trailing implement frame (FIG. 2). When attached, the stabilizing structure 40 prevents interference between the implement hitch 18 and the cart 10 and causes the implement and cart to operate as a single unit.

The tank-supporting frame 20 is fabricated from tubular steel having a square or rectangular cross section. First and second transversely extending beams 42 and 44, respectively, (FIG. 4) are fixed in a fore-and-aft spaced and parallel configuration by a pair of fore-and-aft extending and centrally located connecting beams 46 to provide a generally H-shaped configuration with the free ends of the beams 42 and 44 substantially aligned.

The caster wheel structure 22 includes a fore-and-aft extending tubular beam 50 connected between the transverse beams 42 and 44 at each end thereof by a pair of bracket assemblies 52, each including a flat plate 54 welded to the upper face of the beam 50 and receiving the threaded ends of a pair of U-bolts 56 which extend around the rear, upper and forward faces of the beams 42 and 44. The beam 50 is fixed in a preselected location along the beams 42 and 44 by nuts 58 (FIG. 1) threaded onto the ends of the U-bolts. Once the beam 50 is tightened in position on the ends of the beams 42 and 44, additional strength and rigidity are provided for the tank-supporting frame 20. By eliminating any permanently affixed end connections, the caster wheel structure 22 may be transversely adjusted in any position along the beams 42 and 44 from the outermost ends to a central location near the tank-support structure 26.

The caster wheel structure 22 includes a yoke 60 rotatably supporting a ground wheel 62. The yoke 60 is connected to the beam 50 between the beams 42 and 44 by an upright pivot 64 which extends upwardly through the beam 50 and terminates in an upper end approximately level with the top of the beams 42 and 44. The yoke 60 includes a bight portion 66 which is generally transverse to the forward direction when the wheels are in the straight-ahead position.

Slidably mounted on the beam 50 is a bight-engaging, caster wheel lock assembly 70. The lock assembly 70 includes a plate or angle 72 held against the bottom face of the beam 50 by a pair of U-bolts 74. The plate 72 includes a downwardly directed and rearwardly facing flange 76 which is adapted to engage the forwardly directed face of the yoke 66 when the lock assembly 70 is slid rearwardly on the beam. When the ground wheels 62 are to be locked in the position shown in FIG. 4 for transport without a trailing implement, the U-bolts 74 are loosened and the assembly 70 is slid rearwardly from the position shown in FIG. 1 to the position shown in FIG. 4 with the flange 76 engaging the bight portion 66. The U-bolts 74 then retightened to prevent the yoke 60 from turning about the axis of the upright pivot 64. Once the implement 16 is attached, the U-bolts 74 are loosened and the assembly 70 is moved forwardly to permit the caster wheel to freely caster about the pivot 64.

The hitch structure 30 includes a pair of downwardly and forwardly converging beams or upper brace structure 80 connected at their aft end to the first beam 42 generally in alignment with the connecting beams 46. The forward ends of the beams 80 are connected to the forwardly extending link 34 adjacent the forward end of the double-ended link hitch 32. A second pair of downwardly and forwardly converging beams or lower brace structure 82 include upper ends connected to the aft ends of the first beams 80 and have lower ends connected to the aft end of the double-ended link hitch 32.

The link hitch 32 is supported in generally horizontal fashion between the lower ends of the beams 80 and 82.

Figure 5:
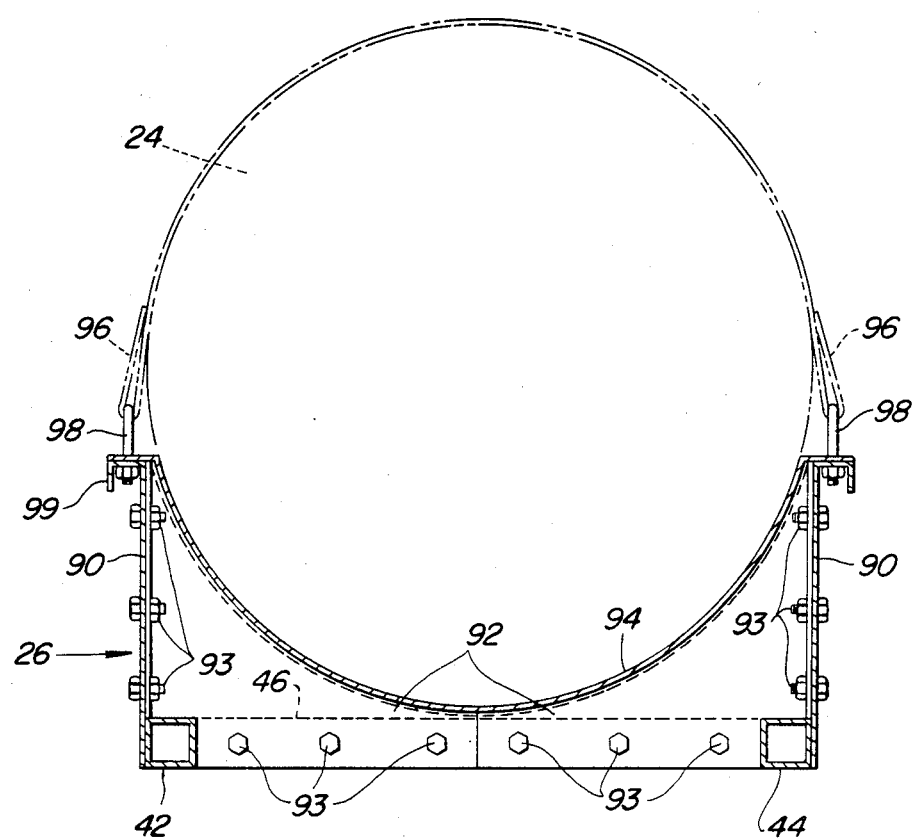
FIG. 5 is a view taken along line 5—5 of FIG. 4.

The tank-support structure 26 includes a pair of flanged panels 90 bolted to the forward face of the first beam 42 and the rearward face of the second beam 44, respectively. Four curved saddle supports 92 are connected by bolts 93 to the panels 90 and to the sides of the beams 46. A curved sheet metal tank support 94 (FIG. 5) rests on the saddle supports 92 and receives the bottom portion of the cylindrical tank 24. Two tank-securing straps 96 are connected by U-bolts 98 at transversely spaced locations on the flanges or upper edges 99 of the panels 90. The bolts 98 also secure the tank support 94 in position. To eliminate stresses in the tank 24, which is typically fabricated from polyethylene, the tank simply rests on the support structure 26 without being bolted or otherwise positively connected thereto. The straps 96 extend over the tank 24 to prevent movement relative to the frame 20.

The hitch structure 30 is supported on the tractor hitch 12 rather than on the implement hitch 18. The forwardly extending link 34 includes a tractor hitch connecting member 100 which is vertically adjustable within an upright bracket 102. Both the member 100 and the bracket 102 are apertured, and the apertures in the member 100 may be aligned with the desired set of apertures in the bracket 102 so that when the member 100 is connected to the hitch 12, the cart 10 will be leveled and the double-ended link hitch 32 will be in approximately a horizontal position. A pair of bolts 104 secures the member 100 within the bracket 102.

Figure 4:
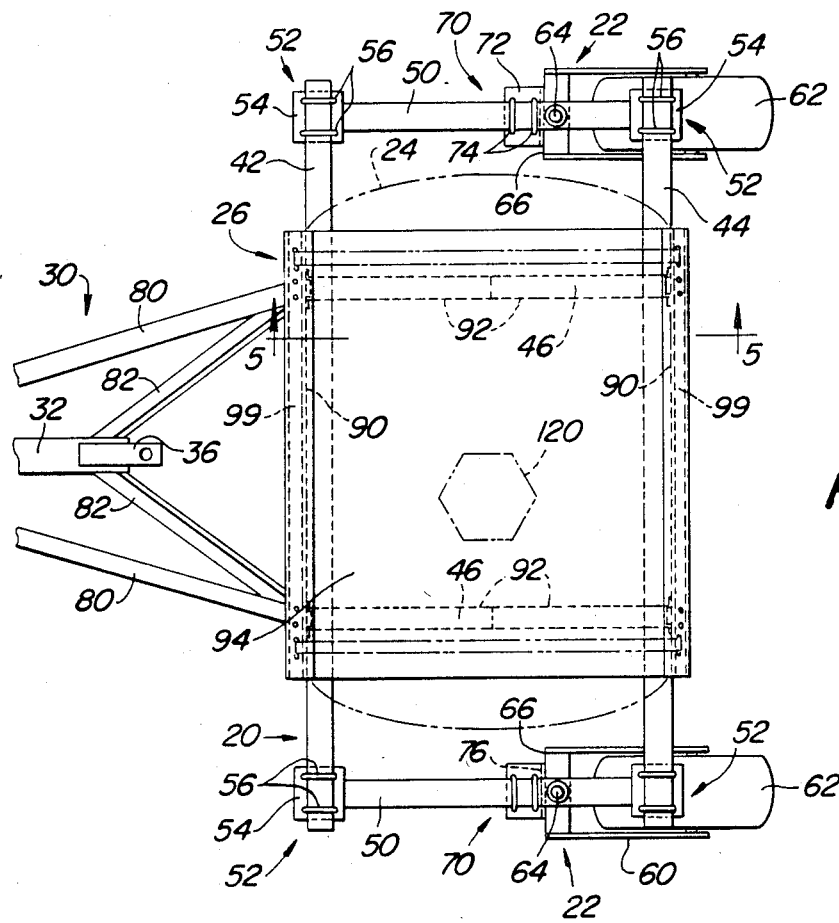
FIG. 4 is a top view of a portion of the cart of FIG. 1 with some parts removed to more clearly show hitch and tank supporting structure.

The stabilizing structure 40 (FIG. 3) includes a first link 106 hingedly connected to a bracket plate 108 which is bolted to the rear face of the beam 44 near one side of the frame 20. The link 106 is telescopingly received within a second link 110 which in turn is hingedly connected to a bracket 112 bolted to the trailing implement 16 at a location opposite the center line from that which the bracket plate 108 is attached. As shown in FIG. 4, the bracket 112 is connected by bolts 114 to one of the main hitch beams 116 of the implement hitch 18. The links 106 and 110 are apertured to receive a pin 118 which fixes the length of the stabilizing structure 40 to center the cart 10 over the trailing implement hitch 18. As the spray cart 10 and the trailing implement 16 are turned from the forward direction by the tractor 14, the stabilizing structure 40 maintains a proper transverse relationship between the hitch 18 and the underside of the frame 20 to prevent interference between the cart 10 and the implement hitch 18. During turns, the wheels 62 caster about the respective pivots 64 to eliminate side draft and tire skidding. The two castering wheels 62 straddle the hitch, and the double-ended link hitch 32 provides a straight line pull from the tractor through the system. The hitch 32 is relatively short to provide close coupling for maximum maneuverability. The rear stabilizer bar allows the cart 10 and the implement hitch 18 to act as a single unit and thereby eliminates the train effect of independent multiple hookups. Tight turns can be made easily to follow contours and make return passes. The two caster wheels 62 and the tractor hitch 12 support the weight of the tank and the solution contained therein so as the weight changes, the tilling and incorporation depth of the trailing implement is not effected.

The tank 24 includes an upper filling port 120. For convenient access to the port, a relatively wide operator platform 122 is connected between the inside faces of the hitch beams 80 (FIG. 1). The platform 122 includes a horizontal top 124 which is generally trapezoidal in shape to conform to the space between the converging beams 80. Side plates 126 extend downwardly from the top portion 124 and are joined at their forward edges by a front plate 128. A step 130 is connected between the beams 80 at a location forwardly of and below the platform 122. A second step 132 is supported forwardly of and below the first step 130. The step 132 is preferably connected to the link hitch 32 and extends outwardly to one side thereof. Handrails 134 are connected to the operator platform 122 adjacent the sides thereof. The arrangement of the operator platform 122 and the steps 130 and 132 permit easy access to the tank 24 and the filling port 120 without need to climb over hitch and frame structure. A spray pump (not shown) is conveniently supported under the top portion 124 of the platform 122 and is connected to a tank supply hose 136 which is in fluid communication with the bottom of the tank 24. A jack support 140 may be selectively attached to the forward portion of the hitch structure 30 when the cart is detached from the tractor 14.

Having described the preferred embodiment, it will be apparent that modifications can be made without departing from the scope of the invention as defined in the accompanying claims.

We claim:

1. A cart for connecting between the hitch of a towing vehicle and the hitch of a trailing implement, said cart adapted for towing in a forward direction and comprising:

a tank-support frame including first and second transversely extending beams having connecting structure located inwardly of the ends of the beams for supporting the first beam forwardly of the second beam in substantially fixed relationship, fore-and-aft extending beams located adjacent the ends of the transversely extending beams, bracket means for adjustably connecting the fore-and-aft beams at preselected transverse locations on the transversely extending beams, said fore-and-aft extending beams when connected providing reinforcement to the ends of the transversely extending beams to thereby provide increased fore-and-aft stability to the tank frame;

a pair of transversely spaced caster wheels connected to and extending downardly from the fore-and-aft beams for supporting the tank-support frame, said wheels being transversely adjustable with said fore-and-aft beams to provide adjustable tread; and hitch structure connected to and extending forwardly and downwardly from the tank-support frame, said hitch structure including a forwardly extending link adapted for connection to and support by the tractor drawbar and a rearwardly extending link adapted for connection to and support of the implement hitch below the tank-support frame, said hitch structure providing substantially straight-line pull from the towing vehicle to the trailing implement hitch.

2. The invention as set forth in claim 1 wherein the beams comprise tubes of rectangular cross section and wherein said bracket means comprise apertured plates connected to one face of the fore-and-aft beam and a bolt fastening means extending around each transverse beam and through the aperture in the plate.

3. The invention as set forth in claim 1 wherein said hitch structure further includes first brace structure extending downardly from the tank-support frame to a first location adjacent therearwardly extending link, and second brace structure located above the first brace structure and extending forwardly and downardly to a second location forward of the first location, and a platform located forwardly of the tank frame and supported on the second brace structure.

4. The invention as set forth in claim 3 wherein the second brace structure comprises a pair of downwardly and forwardly converging beams connected to the first transverse beam and wherein the platform is connected between the uppermost portion of said converging beams.

5. The invention as set forth in claim 4 further comprising a horizontal step member located below the level of the platform and extending between the converging beams forwardly of the platform.

6. The invention as set forth in claim 1 including means for selectively preventing castering of the wheels comprising a stop member slidable fore-and-aft on the corresponding fore-and-aft extending beam.

7. The invention as set forth in claim 6 wherein the caster wheels include a yoke with a generally transversely extending bight portion, and the stop member comprises a transverse contact portion selectively positionable against the bight portion.

8. The invention as set forth in claim 2 wherein the fore-and-aft beams are connected to the lowermost faces of the transverse beams.

9. The invention as set forth in claim 8 wherein the caster wheels include pivots extending upwardly from the top face of the fore-and-aft extending beams between the transverse beams, said pivots having top portions substantially located below a generally horizontal plane defined by the top faces of the transverse beams.

10. The invention as set forth in claim 1 wherein the tank-support frame further comprises transversely extending upright panels connected to the first and second transverse beams and means extending inwardly therefrom for supporting a tank generally above and between said transverse beams.

11. The invention as set forth in claim 4 wherein the connecting structure includes a pair of fore-and-aft extending beams connected to the first transverse beam adjacent the aft ends of the forwardly converging beams of the second brace structure.

12. The invention as set forth in claim 1 wherein the hitch structure includes a fore-and-aft extending and generally horizontal beam supporting the respective links at opposite ends thereof, and upright bracket means for permitting the forwardly extending link to be adjusted vertically to maintain said beam in the horizontal attitude.

13. The invention as set forth in claim 12 further comprising a platform connected to the hitch structure forwardly of the tank frame and wherein said platform defines a structural portion of the hitch structure.

14. The invention as set forth in claim 1 further comprising stabilizer means connected between the tank-support frame and the trailing implement for centering the cart with respect to the trailing implement hitch.

15. The invention as set forth in claim 1 further comprising: tank support structure connected to the frame and comprising upright panels connected to the first and second tranversely extending beams, said panels having transversely extending upper edges, and a fore-and-aft curved sheet structure extending downwardly between the upper edges of the panels in a saddle-like fashion; and a generally cylindrically shaped tank having a lower portion resting on the curved sheet-like structure.

16. The invention as set forth in claim 15 including straps extending around the tank for preventing movement of the tank relative to the frame, and strap securing means extending through the sheet structure and the panel upper edges for supporting the straps and connecting the sheet-like structure to the panels.

17. A cart for connecting between the hitch of a towing vehicle and the hitch of a trailing implement, said cart adapted for towing in a forward direction and comprising:
a tank-support frame including first and second transversely extending beams having connecting structure located inwardly of the ends of the beams for supporting the first beam forwardly of the second beam in substantially fixed relationship, fore-and-aft extending beams located adjacent the ends of the transversely extending beams, bracket means for adjustably connecting the fore-and-aft beams at preselected transverse locations on the transversely extending beams, said fore-and-aft extending beams when connected providing reinforcement to the ends of the transversely extending beams to thereby provide increased fore-and-aft stability of the tank frame;
a pair of transversely spaced caster wheels connected to and extending downardly from the fore-and-aft beams for supporting the tank-support frame, said wheels being transversely adjustable with said fore-and-aft beams to provide adjustable tread; and
hitch structure connected to and extending forwardly from the tank-support frame, said hitch structure including a forwardly extending link adapted for connection to and support by the tractor drawbar and rearwardly extending link adapted for connection to and support of the implement hitch below the tank-support frame, said hitch structure including a fore-and-aft extending hitch beam extending between and supporting the forwardly and rearwardly extending links, first brace structure extending downardly from the tank-support frame to a first location on the hitch beam, second brace structure connected to the tank-support frame adjacent the connecting structure, said second brace structure including a pair of forwardly converging beams and connected to the hitch beam at a second location forwardly of the first location, and a horizontal platform connected between the forwardly converging beams and defining a structural portion of the hitch structure, said hitch structure providing substatially straight-line pull from the towing vehicle to the trailing implement hitch.

18. The invention as set forth in claim 17 wherein the first brace structure includes a pair of downardly and forwardly converging beam members connected at their upper ends to the tank-support frame adjacent the connecting structure and at their lower ends to the hitch beam adjacent the rearwardly extending link.

19. The invention as set forth in claim 18 wherein the forwardly converging beams of the second brace structure include lowermost ends connected to the hitch beam adjacent the forwardly extending link.

20. The invention as set forth in claim 17 wherein the bracket means includes flat plated connected to the ends of the fore-and-aft extending beams, said first and second transversely extending beams are generally rectangular in cross section, and the bracket means further includes bolt means for securing the plates against one of the faces of the transversely extending beams at the preselected transverse locations.

* * * * *

UNITED STATES PATENT AND TRADEMARK OFFICE
CERTIFICATE OF CORRECTION

PATENT NO. : 4,579,361

DATED : 1 April 1986

INVENTOR(S) : Terry Lee Lowe et al

It is certified that error appears in the above-identified patent and that said Letters Patent is hereby corrected as shown below:

Col. 6, line 47, delete "downardly" and insert -- downwardly -- and line 66, delete "aperture" and insert -- apertures --.
Col. 7, line 1, delete "downardly" and insert -- downwardly --; line 2, delete "therearwardly" and insert -- the rearwardly --; line 4, delete "downardly" and insert -- downwardly -- and line 66, delete "tranversely" and insert -- transversely --.
Col. 8, line 1, delete "sheet-like" and insert -- sheet --; line 8, delete "sheet-like" and insert -- sheet --; line 26, delete "downardly" and insert -- downwardly --; line 39, delete "downardly" and insert -- downwardly --; line 49, delete "substatially" and insert -- substantially --; line 55, delete "downardly" and insert -- downwardly --; and line 61, delete "plated" and insert -- plates --.

Signed and Sealed this

Eleventh Day of November, 1986

Attest:

DONALD J. QUIGG

Attesting Officer     Commissioner of Patents and Trademarks